Aug. 30, 1949.     C. P. SMITH     2,480,387
CONSTANT DRAFT HITCH

Filed May 7, 1945     3 Sheets-Sheet 1

INVENTOR.
Charles P. Smith
BY
ATTORNEYS.

Aug. 30, 1949.   C. P. SMITH   2,480,387
CONSTANT DRAFT HITCH
Filed May 7, 1945   3 Sheets-Sheet 2

INVENTOR.
Charles P. Smith
BY
Earl A. Chappell
ATTORNEYS.

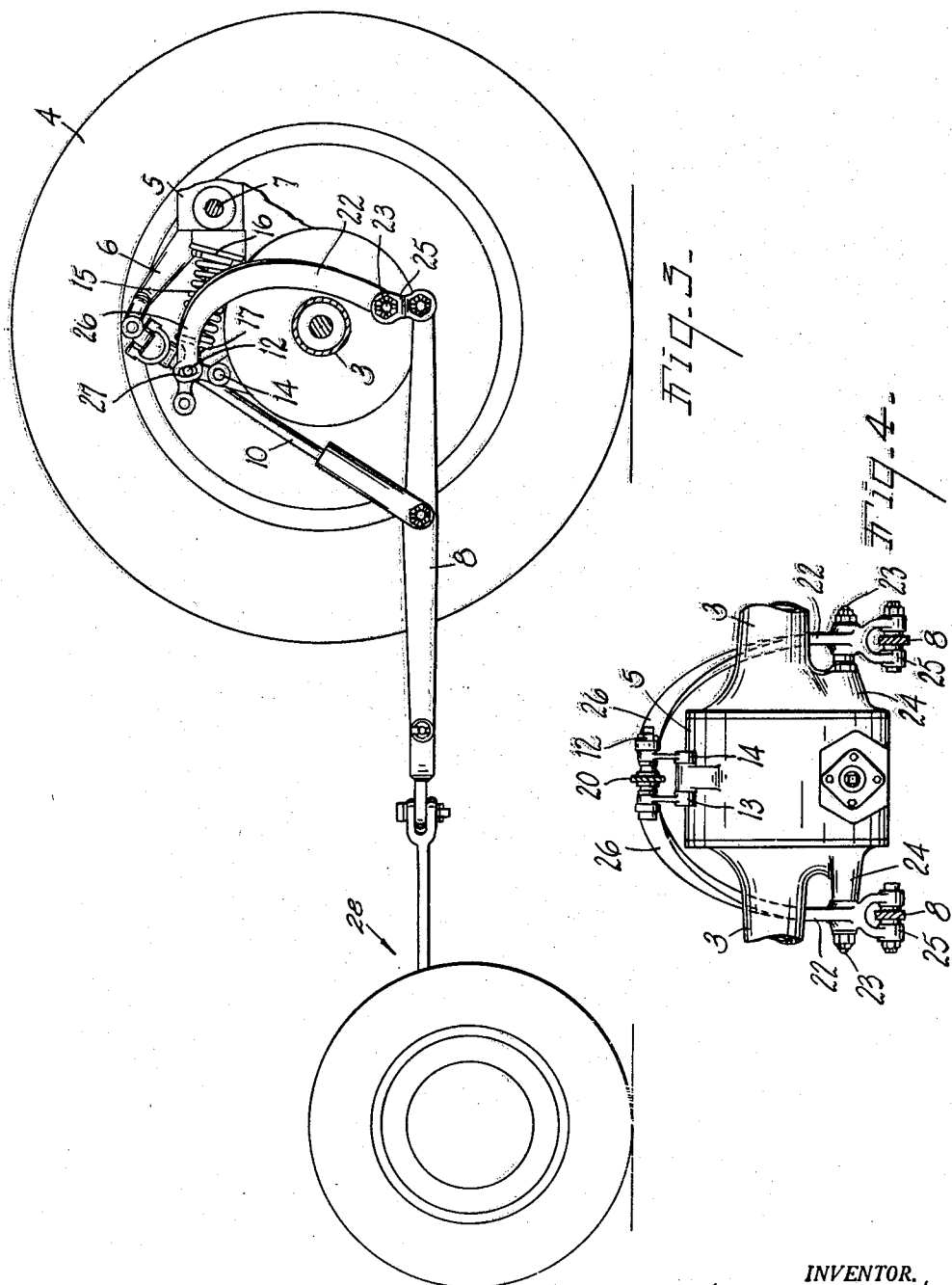

Patented Aug. 30, 1949

2,480,387

UNITED STATES PATENT OFFICE 2,480,387

CONSTANT DRAFT HITCH

Charles P. Smith, Delton, Mich., assignor to
Lester A. Shimmel, Birmingham, Mich.

Application May 7, 1945, Serial No. 592,505

12 Claims. (Cl. 97—50)

This invention relates to hitches and draw bar constructions for farm tractors and the like. It has for its objects:

First, to provide a new and improved device of the type above mentioned.

Second, to provide such a device which when in use on a farm tractor or the like tends to hold the tractor to the ground to give sufficient friction to permit the tractor to draw loads much heavier than the tractor itself.

Third, to provide such a device for use with farm tractors or the like which are provided with power units connected with the implements drawn by the tractor and sensitive to variations in the draft of the implement to control the working depth of the implement to improve the action of such power units and the control of the working depth of the implement and to assure evenness of operation.

Fourth, to provide such a device which is simple and may be made inexpensively.

Other objects and advantages pertaining to details and economies of construction and operation will appear from the description to follow. The invention is defined in the claims. A preferred embodiment of the invention is illustrated in the accompanying drawings, in which:

Fig. 3 is a view similar to Fig. 1 showing the connection of the device for hauling of a wagon.

Fig. 4 is a detail sectional view taken on the line 4—4 of Figs. 1 and 2.

Fig. 5 is a detail view of the end of one of the draft levers employed in the invention.

Figure 1:
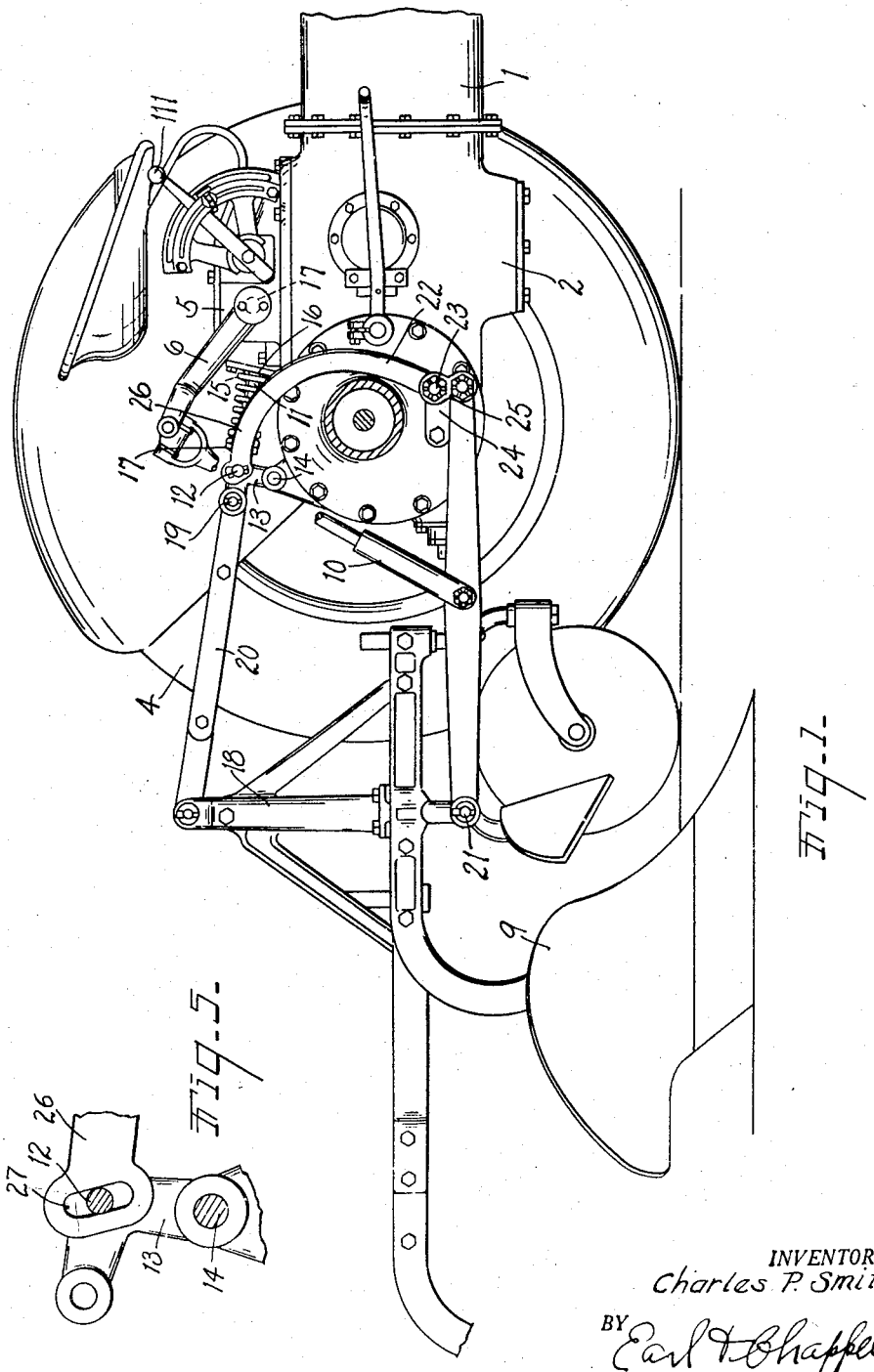
Fig. 1 is a side view partly in section of a farm tractor embodying the invention and having an agricultural implement attached thereto.

The invention is shown attached to a typical farm tractor 1, the rear portion of which is shown in the drawings. The tractor is provided with a suitable gear and differential housing 2, axles 3 and driving wheels 4. The tractor which is illustrated and is preferred in the application of the invention is a tractor which is provided with hydraulic power unit 5 which causes arms 6 to rotate about the axis 7 to raise and lower the draft bars 8 to which the agricultural implement 9, which in this case is illustrated as a plow, are fastened. The arms 6 and the draft bars 8 are connected by a suitable link connection 10 and the power unit 5 is provided with a control handle 111.

The tractor illustrated is in general of the type shown in Ferguson Patents 2,118,180 and 2,118,181, for Tractors for agricultural implements, issued May 24, 1938. These tractors are provided with an automatic control for the power unit to control the working depth of the implement in the ground. The control member is actuated by a rod 11 which is pivotally connected by a pin 12 to a bell crank 13 which is pivoted at 14 to the housing 2. Surrounding the rod 11 is a compression spring 15. This spring bears against the housing 2 at 16 and against the bell crank at 17. It is a powerful spring and preferably one which requires a weight of about 2500 pounds to produce one inch of compression. The rod 11 extends forwardly and downwardly into the housing 2 and the spring also points downwardly and forwardly.

The agricultural implement 9 is provided with an upright 18 which is connected to the point 19 on the bell crank 13 by a link 20 and the controls are so arranged that if the draft on the agricultural implement varies, tending to tilt the implement forward toward the tractor, the rod or plunger 11 will be pushed into the housing 2, tending to actuate the power unit 5 to raise the ends 21 of the draft bars 8 to raise the implement out of the ground. As soon as the draft reaches a predetermined amount, this action stops and the tractor continues to draw the implement through the ground.

Tractors have been made with just this provision for controlling depth of implements, but it has been found that they do not operate as smoothly as could be desired and that there is apt to be a wavy floor to a furrow produced by a plow drawn with such an arrangement. In order to eliminate this fault, I provide draft arms 22 which are pivoted between their ends as at 23 to projecting lugs 24 on the housing at points spaced slightly in advance of and below the center of rotation of the axles 3. The lower end 25 of the draft arm projects downwardly from the lug 24 and slightly forwardly therefrom to give increased leverage, and is pivoted to the forward end of the draft bar 8. The body of the draft arm 22 curves upwardly to clear the axle 3 and extends rearwardly to its upper and rearward end 26 which is pivotally connected at 12 to the bell crank 13. It will be noted that the body of the draft arms 22 bends inwardly over the housing 2 of the tractor and is so formed that when the tractor is driven in reverse, the arm 22 swings over against the housing, so that it is possible to move whatever implement is attached to the tractor rearwardly. At the ends 26 of the draft arms 22, slots 27 are provided which engage the pivots 12 to prevent springing of the draft arms 22 when their upper ends swing forwardly in the direction of the tractor. These slots extend substantially radially of circles described about the lugs 24.

Figure 2:
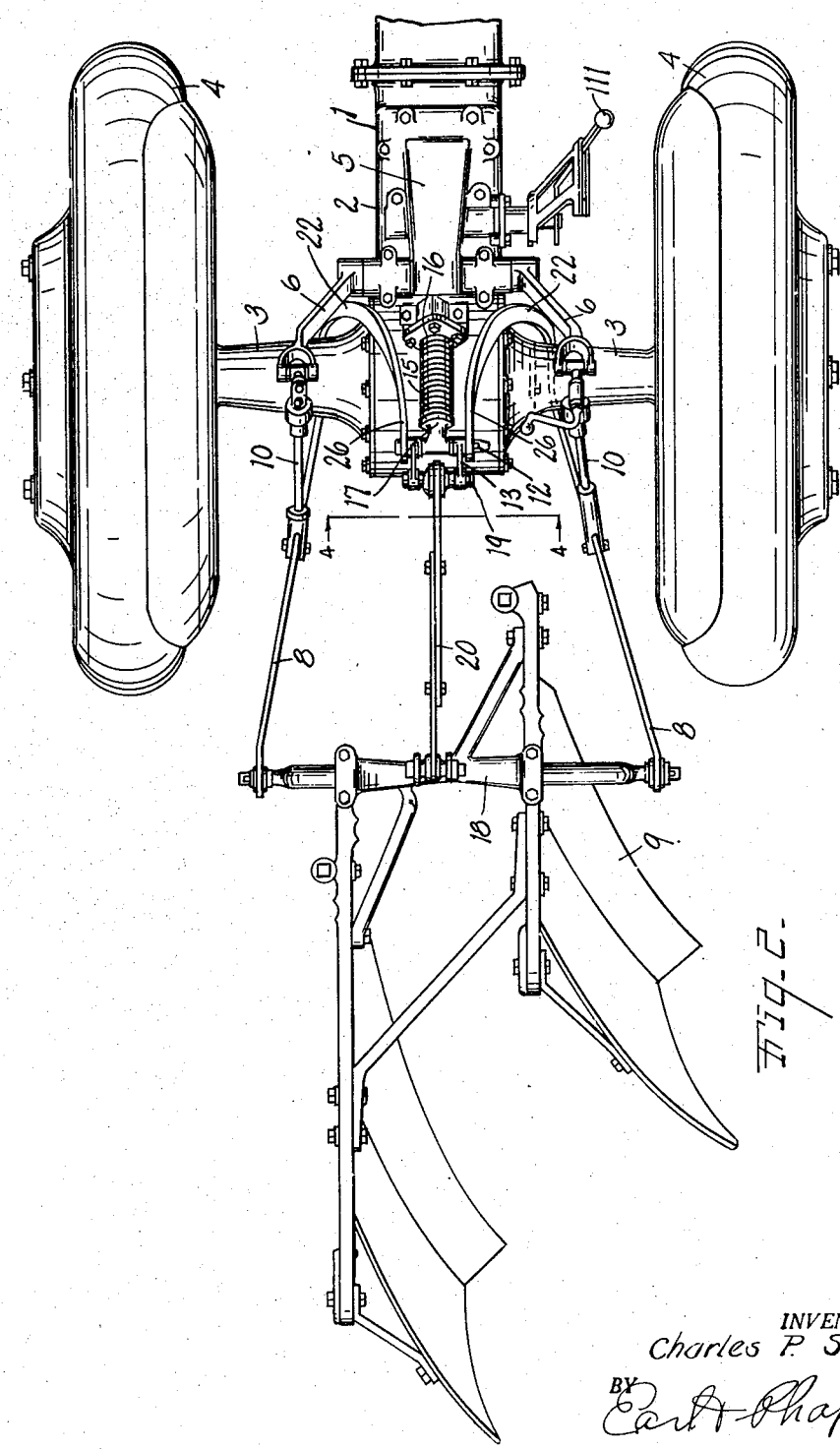
Fig. 2 is a top plan view of the tractor shown in Fig. 1.

It will be noted that the portion of the draft arms 22 extending below the pivot lugs 24 is considerably less than the length of the portions of the arms 22 above the lugs. It has been found that with the proportion shown in the drawings, very satisfactory results are obtained, the mechanical advantage being satisfactory particularly for use on commercial tractors. It may be, however, that different mechanical advantages will be desired and it will be understood by those skilled in the art that the length of the draft arms 22 below the pivot point relative to the length of these arms above the pivot point may be varied to meet various conditions encountered in the field. When it is desired to employ the invention in connection with a farm implement such as a plow, this implement is connected as shown in Figs. 1 and 2. When it is desired to employ the invention for drawing a wagon or the like, the wagon, the front end of which is shown at 28 in Fig. 3, is connected to the draft arm 8 as shown.

It has been found that when the invention is used on a tractor drawing a farm implement such as a plow, the floor of the furrow is kept level throughout and that the power unit which controls the working depth of the implement in the ground works much more smoothly than without the invention. The tractor is held down to the ground providing adequate friction and eliminating slippage of the wheels and jumping of the tractor.

In the past it has been impossible for a tractor directly connected to a wagon or the like to pull more than its own weight. With this invention it is possible for the tractor to pull a wagon or similar load of greater weight. The tractor is pulled down to the ground by the weight of the load and the driving friction is increased. When the invention is employed it is possible to eliminate wheel weights or the use of water in the tires of the tractor and the draft bar connection is particularly desirable because it is flexible for direct draft.

The terms and expressions which have been herein employed are used as terms of description and not of limitation. There is no intention in the use of such terms and expressions of excluding any equivalents of the features shown and described or portions thereof. It is recognized that various modifications are possible within the scope of the invention claimed.

Having thus described my invention, what I claim as new and desire to secure by Letters Patent is:

1. In a tractor having a housing, rear wheels and an axle therefor, said housing including a portion centrally disposed between the rear wheels, and a power unit adapted to control the working depth of an implement in the ground, and control means therefor comprising a plunger, the combination of a pair of lugs projecting laterally from the opposite sides of the centrally disposed portion of said housing at points spaced forwardly and downwardly from the axle of the rear wheel of the tractor, a lever operatively connected to said plunger and pivoted at the top of said housing and extending upwardly therefrom, a compression spring lying between the free end of said lever and said housing and extending downwardly and forwardly from the free end of said lever, a pair of draft arms disposed on opposite sides of said centrally disposed portion of the housing each pivoted between its ends on one of said lugs and having a draw bar pivotally connected to its lower end, the upper ends of said draft arms extending upwardly from said lugs and being pivotally connected to said lever at a point spaced from its pivot by means of connections permitting relative movement between said lever and the ends of said arms in a direction substantially on radii of circles described about said lugs.

2. In a tractor having a housing, rear wheels and an axle therefor, said housing including a portion centrally disposed between the rear wheels, and a power unit adapted to control the working depth of an implement in the ground, and control means therefor comprising a plunger, the combination of a pair of lugs projecting laterally from the opposite sides of the centrally disposed portion of said housing at points spaced from the axle of the rear wheel of the tractor, a lever operatively connected to said plunger and pivoted at the top of said housing and extending upwardly therefrom, a compression spring lying between the free end of said lever and said housing and extending downwardly and forwardly from the free end of said lever, a pair of draft arms disposed on opposite sides of said centrally disposed portion of the housing each pivoted between its ends on one of said lugs and having a draw bar pivotally connected to its lower end, the upper ends of said draft arms extending upwardly from said lugs and being pivotally connected to said lever at a point spaced from its pivot by means of connections permitting relative movement between said lever and the ends of said arms in a direction substantially on radii of circles described about said lugs.

3. In a tractor having a centrally disposed housing and a power unit adapted to control the working depth of an implement in the ground and control means therefor comprising a plunger disposed above the level of the rear wheel axle, the combination of a pair of draft arms pivotally disposed on the opposite sides of said centrally disposed housing each pivoted between its ends to the side of the tractor at a point spaced from the rear wheel axle of the tractor and each having one end disposed above the level of the rear wheel axle and operatively connected to said plunger and having a draft bar pivotally connected to its other end for connection to an implement to be drawn, and compression spring means positioned between the upper ends of said draft arms and the tractor to resist pivoting of said draft arms about their pivots when a rearward force is exerted on said draft bars.

4. In a tractor having a housing, rear wheels and an axle therefor, said housing including a portion centrally disposed between the rear wheels, the combination of a pair of lugs projecting laterally from said housing at points spaced forwardly and downwardly from the axle of the rear wheel of the tractor, a lever pivoted at the top of said housing and extending upwardly therefrom, a compression spring lying between the free end of said lever and said housing and extending forwardly from the free end of said lever, and a pair of draft arms disposed on the opposite sides of said centrally disposed portion of said housing each pivoted between its ends on one of said lugs and having a draw bar pivotally connected to its lower end, the upper ends of said draft arms extending upwardly from said lugs and being pivotally connected to said lever at a point spaced from its pivot by means of slot connections permitting relative movement between said lever and the ends of said arms in a direction substantially on radii of circles described about said lugs.

5. In a tractor having a housing, rear wheels and an axle therefor, the combination of a pair of lugs projecting laterally from said housing at points spaced from the axle of the rear wheel of the tractor, a lever pivoted at the top of said housing and extending upwardly therefrom, a compression spring lying between the free end of said lever and said housing and extending forwardly from the free end of said lever, and a pair of draft arms each pivoted between its ends on one of said lugs and having a draw bar pivotally connected to its lower end, the upper ends of said draft arms extending upwardly from said lugs and being pivotally connected to said lever at a point spaced from its pivot by means of slot connections permitting relative movement between said lever and the ends of said arms in a direction substantially on radii of circles described about said lugs.

6. In a tractor having a housing, rear wheels and an axle therefor, said housing including a portion centrally disposed between the rear wheels, the combination of a pair of lugs projecting laterally from said housing at points spaced forwardly and downwardly from the axle of the rear wheel of the tractor, a lever pivoted at the top of said housing and extending upwardly therefrom, a compression spring lying between the free end of said lever and said housing and extending forwardly from the free end of said lever, and a pair of draft arms disposed on the opposite sides of said centrally disposed portion of said housing each pivoted between its ends on one of said lugs and having a draw bar pivotally connected to its lower end, the upper ends of said draft arms extending upwardly from said lugs and being pivotally connected to said lever at a point spaced from its pivot by means of connections permitting relative movement between said lever and the ends of said arms in a direction substantially on radii of circles described about said lugs.

7. In a tractor having a housing, rear wheels and an axle therefor, the combination of a pair of lugs projecting laterally from said housing at points spaced from the axle of the rear wheel of the tractor, a lever pivoted at the top of said housing and extending upwardly therefrom, a compression spring lying between the free end of said lever and said housing and extending forwardly from the free end of said lever, and a pair of draft arms each pivoted between its ends on one of said lugs and having a draw bar pivotally connected to its lower end, the upper ends of said draft arms extending upwardly from said lugs and being pivotally connected to said lever at a point spaced from its pivot by means of connections permitting relative movement between said lever and the ends of said arms in a direction substantially on radii of circles described about said lugs.

8. In a tractor having a housing, rear wheels and an axle therefor, said housing including a portion centrally disposed between the rear wheels, the combination of a pair of lugs projecting laterally from said housing at points spaced forwardly and downwardly from the axle of the rear wheels of the tractor, a pair of draft arms disposed on the opposite sides of said centrally disposed portion of said housing each pivoted between its ends on one of said lugs and having a draw bar pivotally connected to its lower end, the upper ends of said draft arms extending upwardly from said lugs and extending forwardly of said axle and curving over the housing of the tractor and joined together, and a compression spring extending from the juncture of the upper ends of said arms forwardly and bearing against the tractor housing to resist pivotal movement of said arms about said lugs when a backward pull is exerted on said draw bars.

9. In a tractor having a housing, rear wheels and an axle therefor, said housing including a portion centrally disposed between the rear wheels, the combination of a pair of draft arms disposed on opposite sides of said centrally disposed portion of said housing, each pivoted between its ends and having a draw bar pivotally connected to its lower end, the upper ends of said draft arms extending upwardly from said pivotal connections between their ends and curving over the housing of the tractor and joined together, and a compression spring extending from the juncture of the upper ends of said arms forwardly and bearing against the tractor housing to resist pivotal movement of said arms about said lugs when a backward pull is exerted on said draw bars.

10. In a tractor having a housing, rear wheels and an axle therefor, said housing including a portion centrally disposed between the rear wheels, the combination of a pair of arms disposed on opposite sides of said centrally disposed portion of the housing and pivotally connected to the housing at points spaced forwardly and downwardly from said axle each pivoted between its ends and having a draw bar pivotally connected to its lower end, the upper ends of said draft arms extending upwardly from said pivotal connections between their ends and curving over the housing of the tractor and joined together, and a compression spring extending from the juncture of the upper ends of said arms and bearing against the tractor housing to resist pivotal movement of said arms about said lugs when a backward pull is exerted on said draw bars.

11. In a tractor having a housing, rear wheels and an axle therefor, said housing including a portion centrally disposed between the rear wheels, the combination of a pair of lugs projecting laterally from said housing at points spaced from the axle of the rear wheels of the tractor, a pair of draft arms disposed on the opposite sides of said centrally disposed portion of said housing each pivoted between its ends on one of said lugs and having a draw bar pivotally connected to its lower end, the upper ends of said draft arms extending upwardly from said lugs and curving over the housing of the tractor and joined together, and a compression spring extending from the juncture of the upper ends of said arms and bearing against the tractor housing to resist pivotal movement of said arms about said lugs when a backward pull is exerted on said draw bars.

12. In a tractor having a housing, rear wheels and an axle therefor, said housing including a portion centrally disposed between the rear wheels, the combination of a pair of draft arms disposed on opposite sides of said centrally disposed portion of said housing, each pivoted between its ends and having a draw bar pivotally connected to its lower end, the upper ends of said draft arms extending upwardly from said pivotal connections between their ends and above the housing of the tractor and joined together, and a compression spring extending from the upper ends of said arms and bearing against the tractor housing to resist pivotal movement of said arms about said lugs when a backward pull is exerted on said draw bars.

CHARLES P. SMITH.

REFERENCES CITED

The following references are of record in the file of this patent:

UNITED STATES PATENTS

| Number    | Name         | Date          |
|-----------|--------------|---------------|
| 2,184,422 | Graham       | Dec. 26, 1939 |
| 2,295,898 | Hollis       | Sept. 15, 1942|
| 2,335,156 | McMahon      | Nov. 23, 1943 |
| 2,341,807 | Olmstead et al. | Feb. 15, 1944 |